May 17, 1932.  F. C. BELL  1,858,612
PRESSURE REGULATING VALVE
Filed Dec. 20, 1927
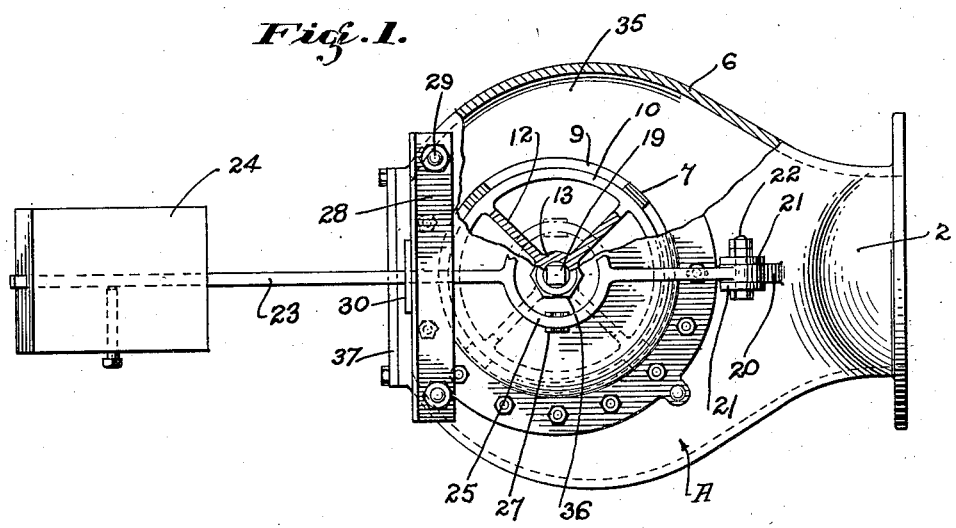
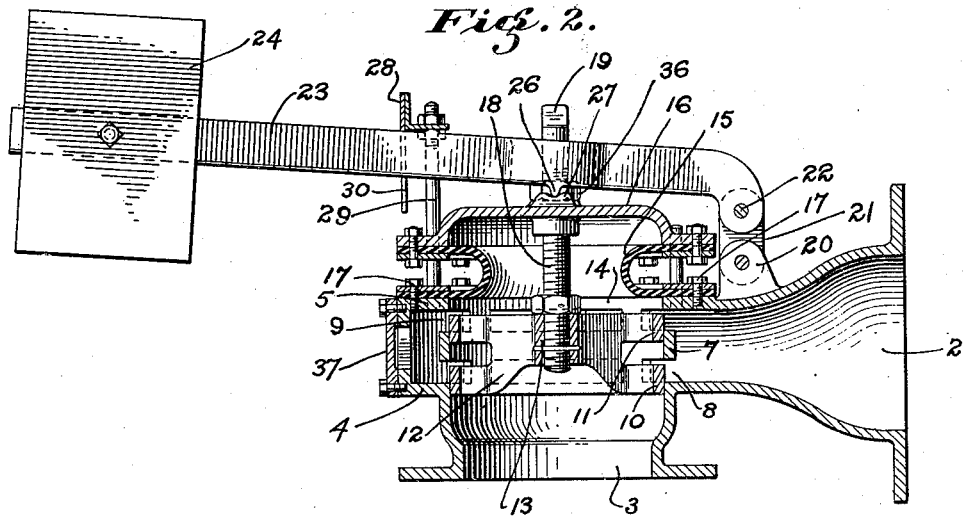
INVENTOR.
Fred C. Bell.
BY Townsend, Loftus & Abbett
ATTORNEYS.

Patented May 17, 1932

1,858,612

UNITED STATES PATENT OFFICE

FRED C. BELL, OF ALAMEDA, CALIFORNIA, ASSIGNOR TO THYLE MACHINERY COMPANY, OF SAN FRANCISCO, CALIFORNIA, A CORPORATION OF CALIFORNIA

PRESSURE REGULATING VALVE

Application filed December 20, 1927. Serial No. 241,314.

This invention relates to pressure regulating valves and especially to a type of valve which is designed to handle heavy pulps, semi-solids and the like.

The object of the present invention is to generally improve and simplify the construction and operation of valves of the character described; to provide a valve which is entirely automatic in operation and which will maintain a uniform predetermined reduced pressure in the discharge side of the valve; to provide a valve which may be quickly and readily adjusted to vary the pressure required; and further, to provide a valve which is particularly adapted to handle thick or heavy pulps, slurry materials, semi-solids and the like. The valve is shown by way of illustration in the accompanying drawings in which:

Fig. 1 is a plan view of the valve, said view being partly broken away and being shown partly in section, Fig. 2 is a central vertical longitudinal section of the valve.

Referring to the drawings in detail, A indicates in general a valve housing which in this instance is provided with an inlet connection 2 and a discharge connection 3. The housing consists of a bottom section 4, a top section 5 and a connecting side wall 6. Formed integral with the top and bottom walls 4 and 5 is a cylindrical section 7 in which is formed a plurality of superposed ports, such as indicated at 8 and 9. The cylindrical section is formed in alignment with the discharge connection 3 and the ports formed in the cylindrical section form communication between the inlet and discharge connections, as indicated. Slidably mounted within the cylindrical section is a sleeve valve consisting of two superposed ring sections 10 and 11, which are connected by radially disposed arms 12 with a central hub member 13. Formed in the upper section 5 of the housing is a central opening 14 which aligns with the cylindrical section and the discharge connection 3, and forming a cover for the opening 14 is an annular flexible diaphragm 15 and a cover member 16. The diaphragm may be constructed of any suitable material, for instance rubber. The diaphragm is U-shaped in cross section as shown in Fig. 2, the lower section thereof being bolted or similarly secured to the upper part of the housing 5, as indicated at 17, and the upper section thereof being secured to the cover member 16. A flexible sealed connection is thus formed between the cover and the opening 14. The valve proper is provided with a stem 18. This stem is threaded substantially from end to end and it extends through the cover 16, the upper end of the stem terminating in a square end 19 so that it may be grasped by a wrench or like tool when it is desired to adjust the sleeve valve with relation to the cover and the bolts 8 and 9, i. e., a threaded connection is formed between the stem and the cover so that such adjustment may be obtained. Formed on the upper section 5 near the inlet connection 2 is a bearing lug 20. Pivotally attached thereto is a pair of links 21 and pivotally attached to the upper ends of the links as at 22 is a lever 23, on the outer end of which is mounted an adjustable weight 24. The end of the lever adjacent the pivotal connection 22 is enlarged to form a ring-shaped section 25 to permit the valve stem 18 to extend therethrough. The opposite sides of the ring are provided with rocker points 26 and these engage rocker bearings 27 formed on the cover section 16. Upward movement of the lever is limited by a cross bar 28 which is supported by end posts 29. This bar is provided with a fork-shaped downwardly extending portion 30 which forms a guide for the lever.

In order to describe the operation of the valve, it may be supposed that the inlet connection 2 is connected with a settling tank and that the hydrostatic head of the tank approximates fifty pounds to the square inch, and further that the discharge side 3 of the valve is connected to the suction side of the slurry pump or the like. In such an installation it is desirable to maintain a continuous predetermined pressure on the suction side of the pump and in this instance, it may be stated that the pressure approximates about six pounds to the square inch. Under these conditions, the weight 24 is adjusted on the arm 23 until it reaches a point where the inflowing material will create sufficient pressure to raise the lever and with it the valve when a pressure in excess of six pounds is encountered, i. e., the material from the settling tank enters the inlet connection 2 and passes through the ports 8 and 9 into the interior chamber of the valve formed by the cylindrical section 7. It completely fills this chamber and as such discharges through the connection 3. At the same time, it is entering under pressure, it will exert an upward pressure on the cover member 3 and will tend to raise the same and simultaneously the valve, as this is connected to the cover section by means of the threaded stem 18. The entrance of an excess of material consequently builds up the pressure sufficient to raise the lever in the valve and upward movement of the valve thus takes place which brings the ring-shaped sections 10 and 11 into register with the ports 8 and 9, thus cutting off or diminishing the flow and thereby maintaining a constant discharge and a uniform pressure. The amount of pressure required can, of course, be changed at any time whether the valve is in operation or not by merely sliding the weight 24 inwardly or outwardly on the lever 23 as the case may be.

By referring to Fig. 1, it will be noted that material entering through the connection 2 will completely surround the inner cylindrical section 7, as the valve housing is enlarged to form an annular surrounding passage, such as indicated at 35. The ports 8 and 9 communicate with this annular passage and ample space is thus provided for a large and liberal flow, this being of particular importance where heavy pulps, slurry solutions, semi-solids and like materials are being handled. Where the viscosity or thickness of the pulp varies, it is also possible to increase or decrease the flow by raising or lowering the valve with relation to the cover section, this being accomplished by merely loosening a locking nut 36 and then rotating the valve stem through the upper squared connection 19 so as to raise or lower the valve with relation to the ports 8 and 9.

The whole valve structure is exceedingly simple and compact. It is quickly and readily adjusted for varying flows and as a hand hope plate 37 is provided at the forward end, it may be readily opened for inspection, adjustment and repairing.

While certain features of the present invention are more or less specifically described, I wish it understood that various changes may be resorted to within the scope of the appended claims. Similarly, that the materials and finishes of the several parts employed may be such as the manufacturer may decide or varying conditions or uses may demand.

Having thus described my invention, what I claim and desire to secure by Letters Patent is:—

1. In a device of the character described, the combination with a cylinder and a valve slidably mounted therein, of an annular flexible diaphragm secured to one end of the cylinder, a pressure plate secured to the diaphragm forming a closure for one end of the cylinder, a lever extending across the pressure plate and engageable therewith, said lever being pivotally attached to the cylinder at one side of the pressure plate and having an adjustable weight on its opposite end to exert a predetermined pressure on the pressure plate, a stem connected with the valve and extending through the pressure plate, and an adjustable connection between the pressure plate and the stem whereby the valve may be raised or lowered with relation to the pressure plate and from a point exterior of the plate.

2. In a device of the character described, the combination with a cylinder and a valve slidably mounted therein, of an annular flexible diaphragm secured to one end of the cylinder, a pressure plate secured to the diaphragm forming a closure for one end of the cylinder, a lever extending across the pressure plate and engageable therewith, said lever being pivotally attached to the cylinder at one side of the pressure plate and having an adjustable weight on its opposite end to exert a predetermined pressure on the pressure plate, a stem connected to the valve and extending through the pressure plate and the lever, a threaded connection between the pressure plate and the stem, and means on the upper end of the stem for rotating the same to raise or lower the valve with relation to the pressure plate and without disturbing the pressure regulating lever.

3. In a device of the character described, the combination with a ported cylinder and the valve slidably mounted therein, of an annular flexible diaphragm secured at one end of the cylinder, a rigid pressure plate secured to the diaphragm forming a closure for one end of the cylinder and having a threaded opening therein, an adjustable pressure regulator connected with the pressure plate and adapted to exert a predetermined pressure thereon, a threaded stem connected to the valve and extending through said threaded opening in the pressure plate and the pressure regulating means, said stem having a squared end engageable for rotation at a point above the pressure plate and the pressure regulating means to raise or lower the valve with relation to the pressure plate and without disturbing the pressure regulating means, and a nut on said stem engageable with the top of the pressure plate to prevent rotation of the stem.

FRED C. BELL.